Feb. 21, 1928.

J. M. THOMPSON

ADJUSTABLE POST FOR GATES

Filed May 11, 1927

1,659,712

Inventor,
John M. Thompson,
by
Attorney

Patented Feb. 21, 1928.

1,659,712

UNITED STATES PATENT OFFICE.

JOHN M. THOMPSON, OF THORPE, IOWA.

ADJUSTABLE POST FOR GATES.

Application filed May 11, 1927. Serial No. 190,581.

My invention relates to improvements for adjustable posts for gates, and the object of my improvement is to supply means for supporting gates swingingly and at any height within the scope of their vertical adjustment, and by simple and effective as well as inexpensive means.

This object I have accomplished by the means which are hereinafter described and claimed, and which are illustrated in the accompanying drawings, it being understood that slight modifications thereof are nevertheless covered by the scope of my invention.

Figure 1:
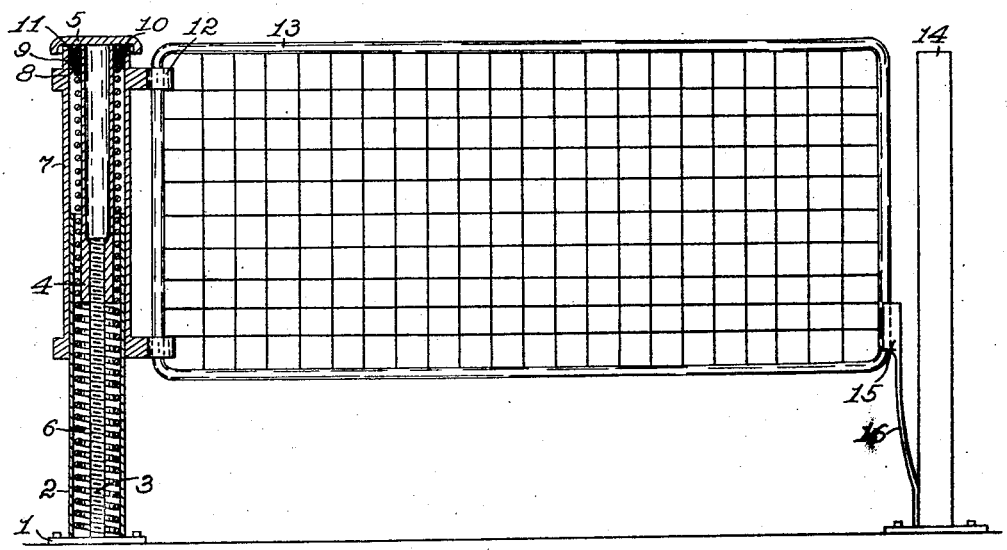

In said drawings, Fig. 1 is a front elevation of a farm gate supported swingingly upon my improved adjustable post and at an adjusted height above the ground, parts of the post being shown in vertical longitudinal central section, other parts being shown in elevation.

Figure 2:
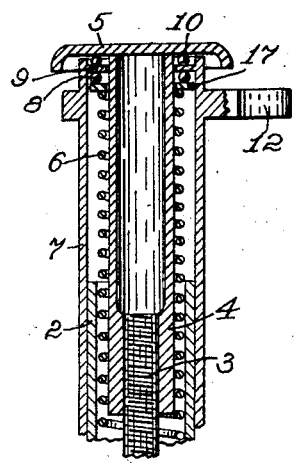

Fig. 2 is a like section of said adjustable post on a larger scale, the upper parts only being shown.

The improved post includes a tubular cylindrical body 2 open at the upper end and closed at the lower which is widened into a foot plate 1 which may be secured upon any convenient fixed base.

An exteriorly threaded standard 3 is fixed centrally within the body 2, and has preferably a thread of wide pitch. A hollow sleeve member 4 has the lower part only of its inner wall threaded to mount it upon the threaded standard 3 and the upper end of said member 4 is closed by a widened top part 5 whose depending circular margin incloses the open top of a rockable sleeve 7 which is both slidably and rockably mounted upon said body 2. The sleeve 7 has vertically separated horizontal brackets 12 which are vertically apertured in alinement to receive the rear stile part of a gate 13, the stile and brackets being fixedly connected. The gate is thus swingingly mounted on the post body 2. There may be a fixed head post 14, and a spring catch-member may be secured upon said head post, such as a vertically disposed bar spring 16 having a widened head 15 which is vertically grooved on its face abutting the head stile of the gate to fit the latter yieldingly.

The inner threaded sleeve 4 and the inner wall of the post body 2 are spaced apart to provide clearance therebetween for a coiled compression spring 6 whose lower end rests upon the basal part 1 and whose upper end supports an inner annular flange 9 at the top of the sleeve 7. Preferably, as shown in said Fig. 2, anti-friction balls 10 are interposed between the flange 9 and the closure plate 5, and a washer 17 is placed upon the upper end of said spring, with anti-friction balls 8 interposed between the washer and the flange, insuring ease in the swinging of the gate 13.

From gates 13 of the type shown, whatever their construction, may be mounted upon my improved adjustable post in the manner set forth. The gate may be adjusted vertically to more or less space its lower reach from the ground below to permit the passage thereunder of small animals, while preventing egress of larger ones, or to clear such obstructions as hard drifted snow.

The adjustment is simply effected by rotating the head closure 5, thus turning the sleeve 4 upon the threaded central standard 3, the wide pitch of the latter effecting quick adjustments. The spring 6 supports the sleeve 7 and the gate elastically in any adjusted position, tending to keep the gate supported at its proper elevation.

As there are no projecting mechanical devices upon the gate for effecting adjustments, and the downwardly flanged headplate 5 serves as a drip-cap, the post is self-contained, and dust or moisture is kept out.

Having described my invention, what I claim as new, and desire to secure by Letters Patent, is:

1. In combination, a hollow post, resilient supporting means therein, a gate having a part rockably slidably mounted upon said post and stepped upon said resilient means, and an adjustable compression member mounted movably upon said post to adjust the position of the gate relative to the post while variably tensioning said resilient means.

2. In combination, a hollow post, a threaded central standard mounted fixedly therein, an interiorly threaded sleeve mounted upon said standard and having its upper end flanged annularly outwardly, an outer sleeve mounted rockably and slidably upon said post and limited in upward movement by the flange on the threaded sleeve, a gate fixedly bracketed on said outer sleeve, and resilient means mounted within said post supporting said outer sleeve and variably tensioned thereby when the position of said threaded sleeve is adjusted upon the standard.

3. In combination, a hollow post, a threaded central standard mounted fixedly therein, an interiorly threaded sleeve mounted upon said standard and having its upper end flanged outwardly, a resilient device in said post, an outer sleeve mounted rockably and slidably upon said post and limited in upward movement by the flange on the threaded sleeve, anti-friction supporting means between said resilient means and said outer sleeve, and a gate fixedly bracketed upon said outer sleeve, said resilient means being tensioned when said threaded sleeve is turned in one direction.

In testimony whereof I affix my signature.

JOHN M. THOMPSON.